Aug. 18, 1959    F. G. DANHIER    2,900,487
PROCESS AND DEVICE TO RETAIN IN POSITION THE LIQUID METAL IN
AUTOMATIC VISIBLE ARC WELDING IN 3 O'CLOCK BUTT JOINTS
Filed April 11, 1958    4 Sheets-Sheet 1
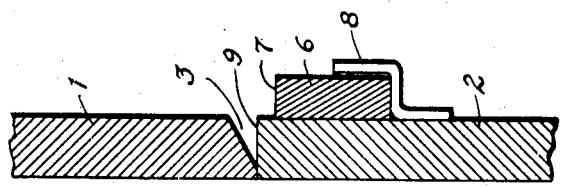
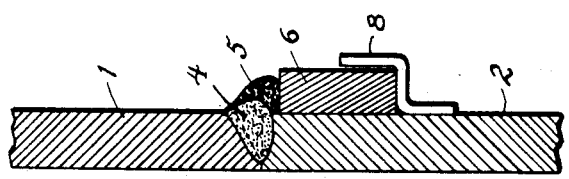
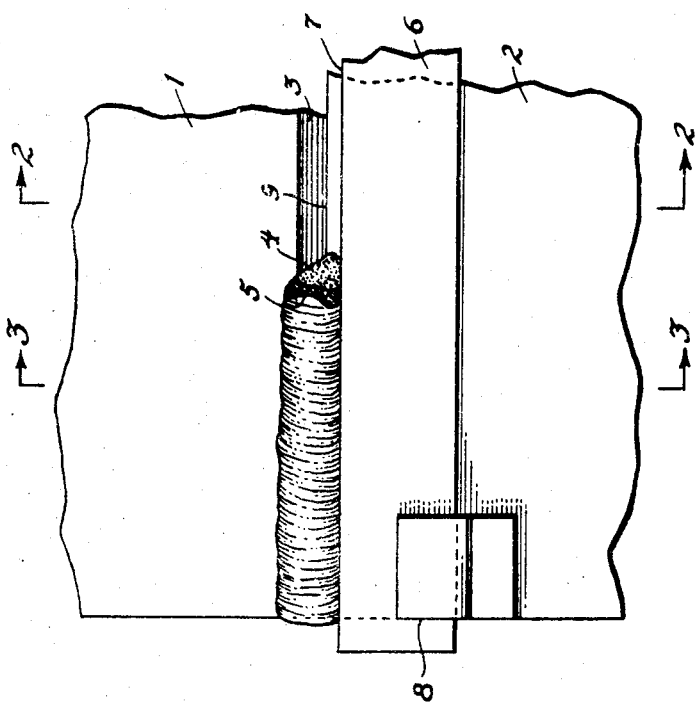
INVENTOR
FRANCOIS G. DANHIER
BY
ATTORNEYS Aug. 18, 1959 F. G. DANHIER 2,900,487
PROCESS AND DEVICE TO RETAIN IN POSITION THE LIQUID METAL IN
AUTOMATIC VISIBLE ARC WELDING IN 3 O'CLOCK BUTT JOINTS
Filed April 11, 1958 4 Sheets-Sheet 2
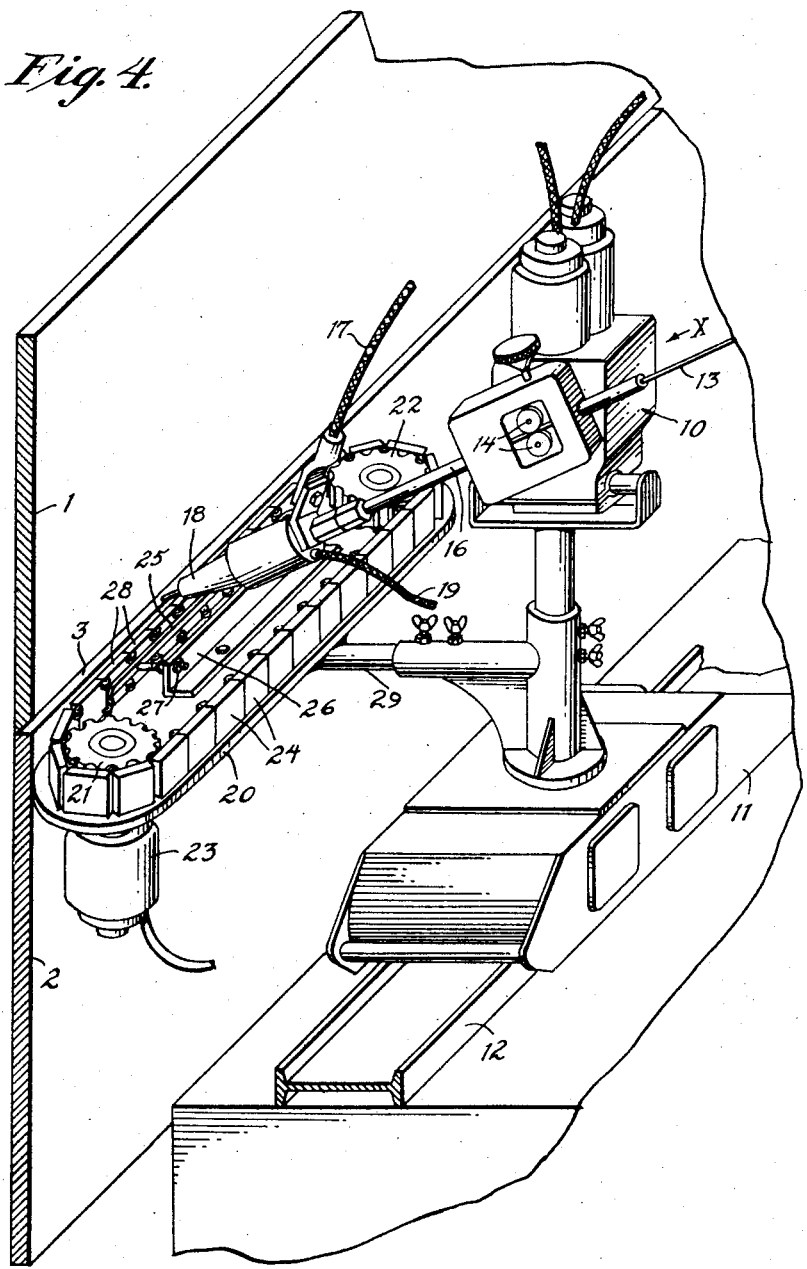
Fig. 4.
INVENTOR
FRANCOIS DANHIER
BY
ATTORNEYS

INVENTOR
FRANCOIS DANHIER
BY
ATTORNEYS

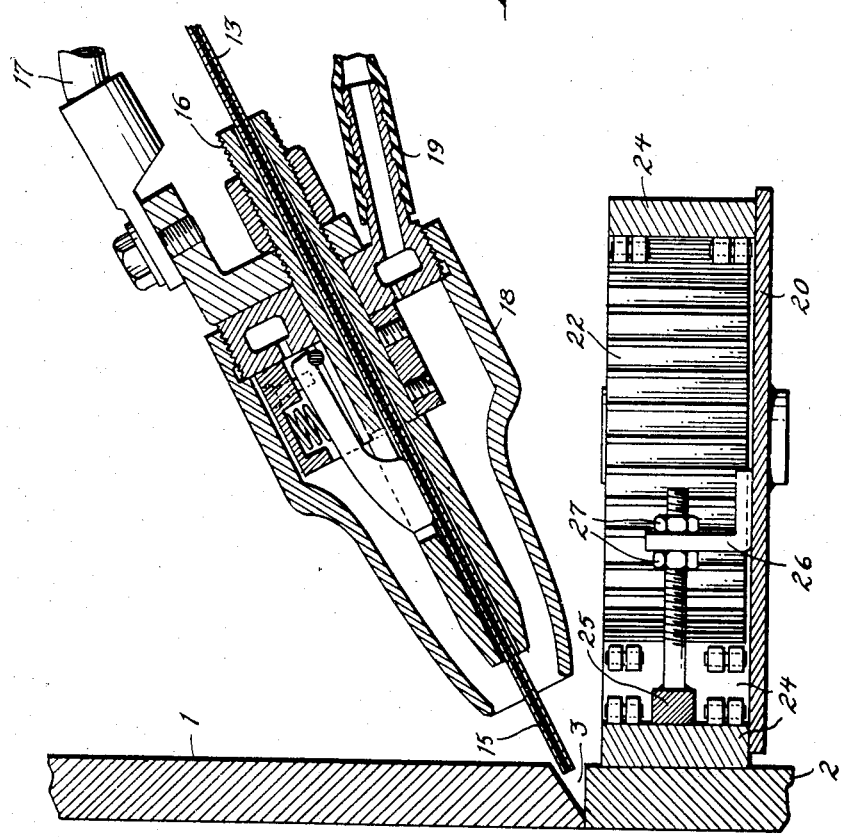

United States Patent Office 2,900,487
Patented Aug. 18, 1959

2,900,487

PROCESS AND DEVICE TO RETAIN IN POSITION THE LIQUID METAL IN AUTOMATIC VISIBLE ARC WELDING IN 3 O'CLOCK BUTT JOINTS

François Georges Danhier, Anderlecht, Brussels, Belgium, assignor to La Soudure Electrique Autogene, S.A., Brussels, Belgium, a corporation of Belgium Application April 11, 1958, Serial No. 727,898

4 Claims. (Cl. 219—126)

The present invention relates to a process and device to retain in position the liquid metal in automatic visible arc welding in 3 o'clock butt joints.

A purpose of the invention is to obtain better support of a molten metal pool in 3 o'clock position welding.

A further purpose is to provide copper strips or slabs beneath the pool of a configuration which will assure adequate cooling capacity, and preferably to advance the strips as the weld advances.

The present application is a continuation-in-part of my copending application Serial No. 635,239, filed January 22, 1957, for Automatic Arc Welding Process, Equipment and Electrode.

Horizontal butt welding between vertical plates is generally performed by manual welding. In this so-called "3 o'clock" welding position, the molten metal tends to flow downward and ahead of the joint. It is held in place only by its surface tension, which is sometimes too weak compared to the weight of the molten metal. The size of the molten pool which can be so supported is very small. This is why automatic arc welding, with its very high currents and large pools of molten metal, has been considered for a long time as being impractical for this type of welding.

Recently, however, thanks to the submerged arc welding process, 3 o'clock welding became possible under fairly good conditions. In this process, the liquid weld metal is held in position by a dam of granulated flux, with a layer of molten slag in between, said dam resting upon a movable support arranged alongside the joint to be welded.

Practical operations in this submerged arc welding present numerous difficulties due to poor fit up, lack of visibility of the joint, the problem of delivering and of holding granular flux against a vertical wall, and of recuperating the unused flux later. Furthermore, this process requires that the flux be perfectly dry, which prevents welding in the open when atmospheric conditions are unfavorable (fog, humid weather or rain).

The automatic submerged arc welding machines for 3 o'clock joints comprise a carriage rolling upon the upper edge of the top plate, from which two frames are hung, one of each side of the welded plates and each carrying a submerged arc automatic welding head level with the 3 o'clock joint between the plates. Below the level of the joint, a support parallel to the line of the joint is provided in such machines to hold in place the granulated flux used in the submerged arc process. In one form of realization, this flux, whose purpose is to hold in position the metal melted by the arc and to protect it from the air, is laid upon a strip attached to the corresponding frame, said strip sliding against the lower plate under elastic pressure. Therefore, the strip moves along with the welding head, at the same speed, and the granulated flux supported by the strip is carried along with it.

In another form of execution, each frame carries two pulleys upon which an endless belt is wound, said belt having attachments made of steel, asbestos or wood intended to support the granulated flux when pressed against the lower plate.

Whether stationary or moving, the support in these machines is always and solely intended to hold up a thick layer of cold, solid granulated flux. This layer is itself supporting the hot, liquid or viscous slag. Finally, this liquid slag keeps the liquid metal in place.

To sustain such a heavy layer of granulated flux, it is necessary for this flux support to have a substantial dimension perpendicular to the plate, because of the natural slope of the flux.

Due to the granular texture of the flux, it is not necessary in these known devices to maintain pressure of the supporting elements against the plate to be welded, as to obtain for instance good tightness between the elements and the plate. For the same reason, the size of each of the supporting attachments, and therefore their number, are immaterial, at least as far as their function is concerned, which is to support a solid granular material. Finally, it is not required that the attachments be made of stainless or noncorrodible material, since solid flux is chemically inactive.

Because of the shortcomings of the submerged arc process, and because of the advantages of visible arc automatic welding processes, it became desirable to find, for the latter processes, means to support in the 3 o'clock position molten pools of substantial sizes.

In the case of visible arc welding under protection of carbon dioxide shielding, using an electrode wire which also supplies the flux, supports such as described above are absolutely unsuitable. They had never been intended for such use. For one thing, in the latter welding process, no mass of solid granulated flux is used. A composite electrode brings instead in the arc a small amount of flux at a time. This flux shows up immediately upon the molten metal as a layer of liquid slag, heated to a temperature averaging 1,500 degrees centigrade.

The known devices intended to contain liquid slag through an interposed thick layer of granulated flux are protected against the heat radiated by the arc by this very thick layer of flux and thus they are not subject to the arc radiation heat, to the heat conducted through the plates being welded, and to the direct contact of a liquid slag brought at 1,500 degrees centigrade temperature. None of the materials described for use in these machines, or practically used in them, could resist contact with liquid slag.

Textile belts and wood burn immediately, asbestos and ceramic-like materials dissolve rapidly in liquid slag, steel heats up very rapidly and is then destroyed by oxidation. The known devices would therefore not be capable of directly containing liquid slag.

To keep in place molten metal in the visible arc welding process, the liquid slag must be rapidly solidified upon a suitable support, while giving the slag sufficient base.

Experiments conducted by the inventor have shown that the desired result could be obtained by setting against the lower plate, on the side being welded, parallel to the joint, a copper strip having a rectangular cross-section with a height at least three times the thickness. This strip may optionally, but not necessarily, be cooled by water circulation.

While welding, the liquid slag being insufficiently held over the molten pool by its surface tension, tends to flow down, and it reaches the copper strip where it spreads. Because of the high thermal conductivity of that metal, the slag is cooled very rapidly and becomes solid in its lower portion, holding the liquid metal in position until said metal is completely solidified.

In the process as per the invention, the tip of the carbon dioxide nozzle may be located easily close to the plate, while still retaining, for a given length of slag-supporting strip, a relatively large mass of metal to absorb rapidly the heat from the molten slag flowing upon it. This is so because the rectangular strip has a height at least three times greater than its thickness, which permits selecting a relatively small thickness while retaining the desired volume for a unit length of the strip. Furthermore, the fact that the strip is made of copper contributes also to facilitate the heat absorption from the slag, due to the excellent thermal conductivity of said metal. Therefore, the reduction in strip thickness made possible for a given heat absorption capacity allows for setting the tip of the carbon dioxide nozzle closer to the joint. Finally, copper is not corroded by the liquid slag coming in contact with it, and it remains practically nonoxidized under normal conditions of use.

Preferably, the copper strip will be set against the lower edge, parallel to the joint, at a level such that its upper edge will be lower than the lower lip of the joint by a distance of 0.2 to 0.7 times the thickness of the lower plate. Horizontal butt joints between vertical plates ½ inch thick can be welded in this way in one single pass.

Thanks to arc visibility, the process can be used with poorly-fitted joints, since the operator can always, during the welding operation, modify the position of the wire, the travel speed and the current intensity. The copper strip may be held against the lower plate by any convenient means. However, to weld joints of great length, the support is made of strip sections arranged end to end. This support may be replaced by an endless chain with movable copper strip attachments.

To facilitate the welding of 3 o'clock joints using this form of the process as per the invention, an advantageous device for visible arc automatic welding comprises a motorized carriage rolling parallel to the joint and carrying a frame in which two pulleys mounted on vertical axes guide an endless horizontal chain provided with adjoining metallic elements which take position in succession under the weld joint, this device being characterized by the elements being made of copper slabs whose height is at least three times the thickness, said slabs taking position directly in contact with the molten slag to support it and to cool it energetically.

To prevent the liquid slag from leaking between the lower plate and the slabs intended to support and to cool it, the device as per the invention is also provided advantageously with pressure means applied against the inside of the endless chain, said means being adjustable with respect to the aforesaid carriage so that the said copper slabs can be applied firmly against the lower plate to be welded.

The drawings attached to this specification show schematically two forms of realization of the process as per the invention, and one machine to realize the process.

Figure 1 is a front view of a weld joint between two butt-assembled vertical plates, seen during the application of the process as per the invention.

Figures 2 and 3 are vertical cross-sections by planes shown as 2—2 and 3—3 of Figure 1.

Figure 4 is a perspective view of part of an automatic machine as per the invention, in the position it occupies while welding with the assistance of an endless chain carrying sections of copper strips.

Figure 6 shows, at a larger scale, a vertical section of part of the machine of Figures 4 and 5, in the vicinity of the welding site.

In all these figures, identical reference numbers designate identical elements.

Figure 5:
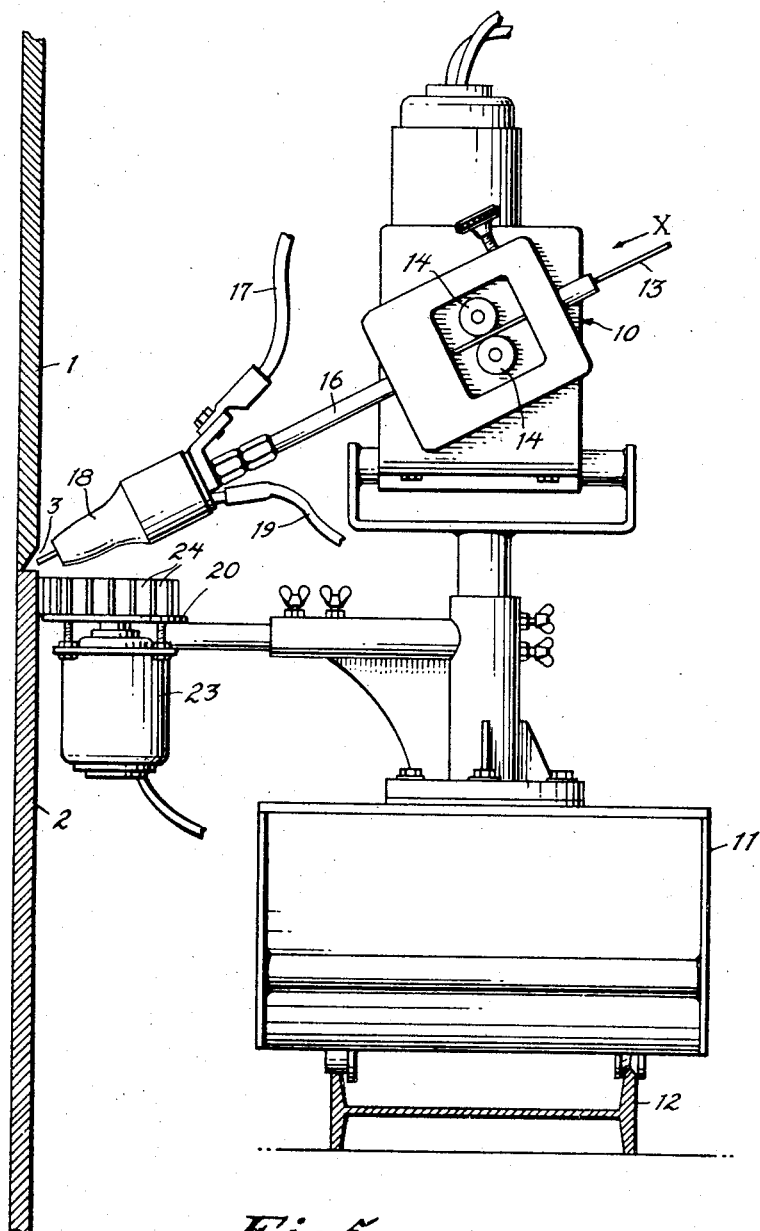
Figure 5 is a front view of the machine shown in Figure 4.

In Figures 1 to 3, 1 and 2 are butt-assembled vertical plates to be welded, 3 is the horizontal joint to weld, 4 is the weld bead already deposited, 5 is the slag covering the metal of said weld and 6 is a copper strip which supported said slag when the latter was liquid. The said slag, in turn, was supporting metal 4 when the latter was molten.

As can be seen, the upper face 7 of said strip 6 pressed against the lower plate 2 is held in place by a support 8 slightly below the lower lip 9 of joint 3, at a distance about 0.3 times the thickness of said plate.

The machine shown in Figures 4 to 6 comprises a welding head 10 carried by a movable structure 11 consisting for example in a carriage guided upon a beam section 12. This carriage can move parallel to the joint 3 of the vertical plates 1 and 2. A composite steel wire 13 is fed by feed rolls 14 in the direction of arrow X. This composite wire contains a core 5 (Figure 6) containing in particular the flux. Its orientation is adjustable with respect to the head 10. It passes through a wire-guide 16 receiving the current from a conductor 17, then through a nozzle 18 receiving optionally carbon dioxide from a tube 19. The jet of carbon dioxide is directed toward the joint 3 at the point where the arc must strike between the wire 13 and the plates to be welded.

In the machine shown, the carriage 11 carrying the head 10 is connected by an arm 29, of adjustable length, to a table 20 upon which two sprockets 21 and 22 are mounted. The first sprocket can be rotated by an electric motor 23 and a speed reducer. It actuates a chain consisting of a number of copper slabs 24 hinged to each other. These slabs are pressed against the lower plate 2 when passing between the latter and a shoe 25 whose position with respect to a stationary support 26 can be adjusted by nuts 27. The upper face 28 of slabs 24 is slightly below the lower lip of joint 3 to be welded. The slabs perform during the application of the process the same function as the moving strip 6 shown in Figures 1 to 3.

During welding, these slabs locate themselves in succession under the welding site where they support and cool the liquid slag.

In the figures, it can be seen that strip 6 and slabs 24 have a height slightly more than three times the thickness. This allows for close proximity between the joint 3 and the tip of the carbon dioxide nozzle, while retaining great heat absorption capacity in the copper elements supporting the slag.

It can also be seen in Figure 4 that the copper slabs 24 have a length which is also greater than three times the thickness of these slabs. In this way, the number of junctions between slabs is reduced, and so is the risk of slag leakage in these junctions.

It is obvious that the invention is not exclusively limited to the forms of realization shown, and that many changes can be made in the form, arrangement and design of certain of the elements used to realize the invention, provided these changes do not contradict the object of any of the following claims.

Having thus described my invention, what I claim as new and desire to secure by Letters Patent is:

1. The process of welding 3 o'clock horizontal butt joints between two butt assembled vertical plates which comprises supplying flux and filler metal with the flux as a core in a composite wire of filler metal, maintaining a visible arc to the plates at the joint from said wire, with the arc unobstructed by the slag, blanketing the arc with a protective screen of carbon dioxide discharged from a nozzle surrounding said wire, allowing slag formed by the welding arc to flow down over the side of the weld bead and solidifying the slag overflow below the weld bead against a copper element having cooling capacity and thus forming and supporting a dam of solidified slag on the upper surface of the copper element, and maintaining the dam of solidified slag in position stationary with respect to the weld bead and plates until the weld metal completely solidifies.

2. The process of claim 1, which comprises withdrawing the copper element from the plate after the weld has advanced beyond the copper element and solidification is complete at the copper element and then after the copper element has cooled placing the copper element in a more forward position against the lower one of the plates and there repeating the process.

3. The process of claim 2, which comprises placing the copper element in each instance lower than the lower lip of the joint by a distance of from 0.2 to 0.7 times the thickness of said lower plate.

4. The process of claim 3, which comprises laterally pressing the copper element against the said lower plate in each of the positions.

References Cited in the file of this patent

UNITED STATES PATENTS

| | | |
|---|---|---|
| 2,288,032 | Smith | June 30, 1942 |
| 2,315,358 | Smith | Mar. 30, 1943 |
| 2,395,723 | Chmielewski | Feb. 26, 1946 |
| 2,713,106 | Arnold | July 12, 1955 |